Oct. 16, 1956     L. KOSTEN     2,767,315
RANDOM DIGIT GENERATOR
Filed Dec. 10, 1951     2 Sheets-Sheet 1
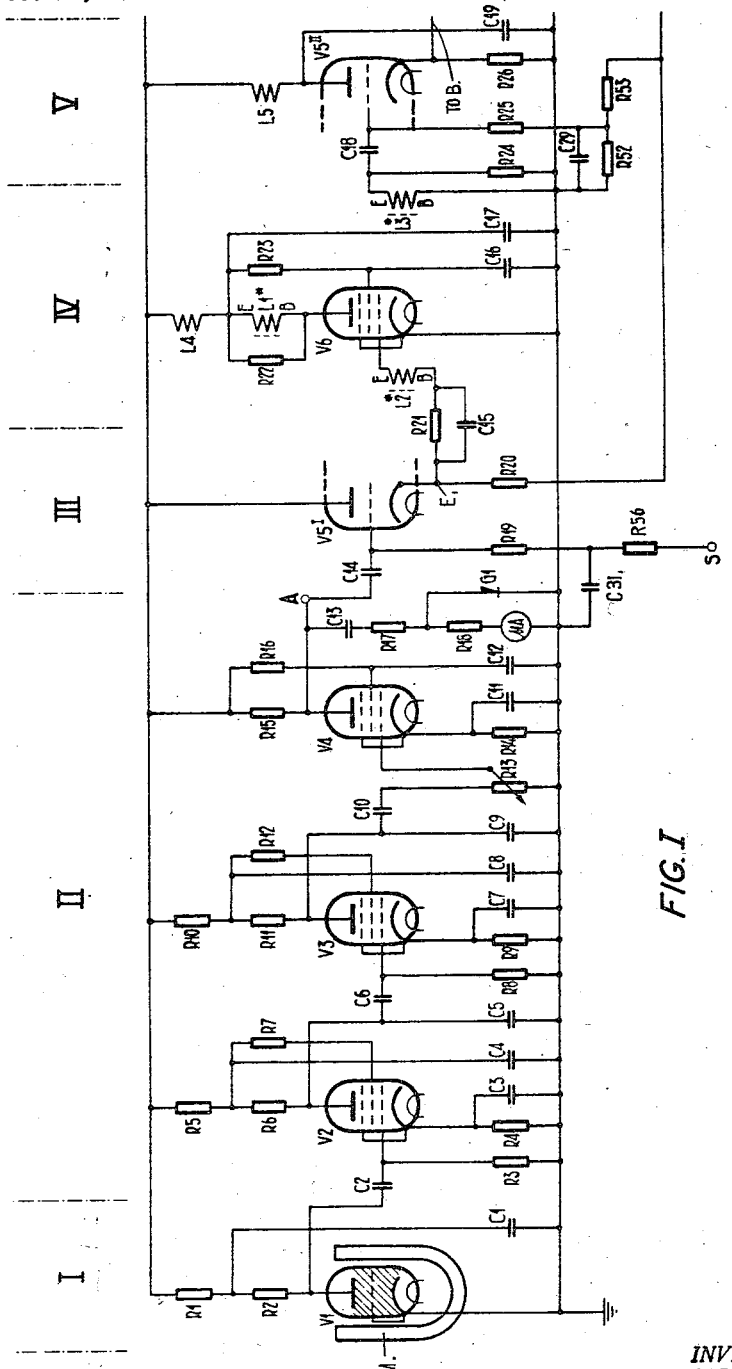
FIG. I
INVENTOR.
LEENDERT KOSTEN
BY Hugh A. Kirk

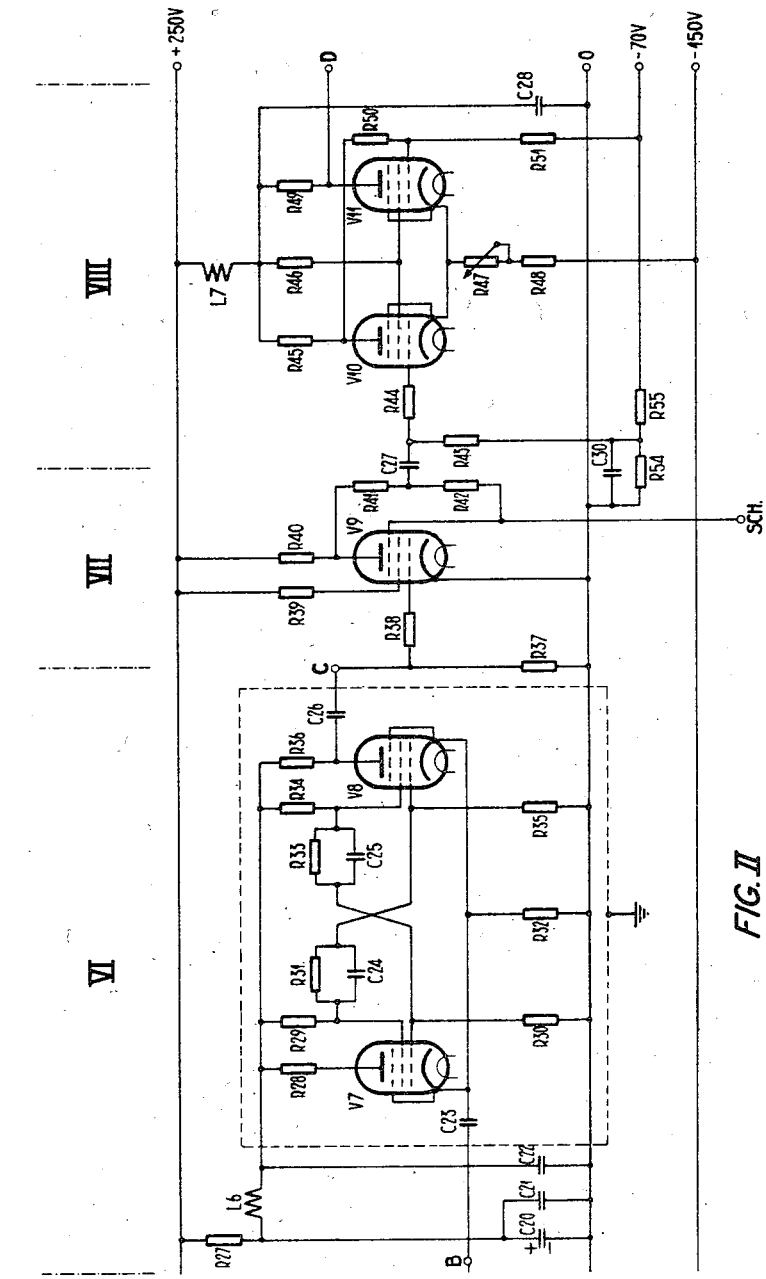
FIG. II
INVENTOR.
LEENDERT KOSTEN
BY Hugh A Kirk

United States Patent Office 2,767,315
Patented Oct. 16, 1956

2,767,315

RANDOM DIGIT GENERATOR

Leendert Kosten, The Hague, Netherlands, assignor to De Staat der Nederlanden, Ten Deze Vertegenwoordigd door de Directeur-Generaal der Posterijen, Telegrafie en Telefonie, The Hague, Netherlands Application December 10, 1951, Serial No. 260,867

19 Claims. (Cl. 250—27)

This invention relates to a random digit generator. More particularly, it deals with an electronic circuit for such a generator in which electrical impulses or electronic pulses are produced at intervals varying according to a chance function, each of which pulses produces a change in state of a counting circuit so that when the supply of pulses through the counting circuit are stopped, the digit at which the counting circuit then rests is a randomly selected digit. Such a generator circuit may be used for establishing fictitious traffic in the testing of an electronic switching system, such as the circuits in an automatic telephone or telegraph system.

An apparatus similar to that invention is described in the article by Broadhurst and Harmston in "The Post Office Electrical Engineers Journal" of January 1950, pages 180–187 (vol. 42 part 4) entitled, "An Electronic Traffic Analyser," in which article a number of random digit generators are employed in a machine for determining the blocking and waiting chances and the like, corresponding to traffic in an electronic automatic switching system, such as at a telephone exchange. The device of this article comprises a noise source as a fluctuating pulse generator which noise is connected to a normally non-conductive amplifier that only becomes conductive if the noise peaks produced are higher than a certain level. These noise peaks that are permitted to pass the amplifier are then supplied as switching pulses to a counter circuit whose state is locked periodically to select therefrom the random digits.

In order to carry out certain involved mathematical calculations, such as matrix inversions, etc. in an automatic computor, it has been suggested to provide an apparatus with number tables designed according to the laws of chance (see the article by G. E. Forsythe and R. A. Liebler "Matrix Inversion by a Monte Carlo Method, in Mathematical Tables and Other Aids to Computation" July 1950, page 127). The series of numbers of such tables may be derived from the results obtained from the average gains determined by repeatedly playing a game of solitaire, for which machines have already been developed (see the thesis of Jac. Kruithof "De Rotary Verkeersmachine" (The Rotary Traffic Machine) Rijks Universiteit, Ghent (Belgian Government University, Ghent, Belgium), Feb. 3, 1945, published by Bell Telephone Company, Antwerp, Belgium).

An essential component of any random digit generator is a device that operates very quickly and is analagous to a roulette having a very large amount of numbers. The amount of these numbers may be selected to be equal to a power of 2, so that an arbitrary number can be determined from $2^n$ possible numbers by choosing each of the binary digits of this number arbitrarily. Thus, a random digit generator can be constructed from a number of binary digit generators.

It is essential that random digit generators satisfy the requirements of stopping after a certain adjusted time in one of a number of possible stable final states, and that for each state, an equal probability is obtained independent of external conditions or of previous adjustments. Up to now, including the above mentioned devices, it has been very difficult to construct an electronic pulse type of a random digit generator which meets these requirements of complete fortuity, because of the following two reasons:

(1) When two pulses occur that nearly coincide, it depends on the separating power of the counter circuit whether it will change its position once or twice. In general this separating power will also be dependent on the position in which the counter is at that very moment, because, practically speaking, complete symmetry of the counter cannot be attained. If the separating powers in the different positions are unequal, however, this will result in a preference being given to certain states as being final states; and (2) When at the end of an operating period, the impulse series is interrupted by means of a gate circuit, it may happen that due to this very fact, or other external causes, that a pulse becomes mutilated. Again it depends on the sensitivity of the counter whether or not such a mutilated pulse will operate the counter, as well as upon the state of the counter due to unavoidable dissymmetry phenomena, and accordingly, a preference to certain states as final states again can occur.

Accordingly, it is an object of the present invention to produce a random digit generator which avoids the above objections and produces complete fortuity in the selection of digits, thereby ignoring the sensitivity and resolving power of the generator, respectively.

Another object is to produce such a random digit generator in a simple, efficient, effective and economic manner which is independent of external forces or normal apparatus limitations.

Generally speaking, the random digit generator of the present invention comprises an astable relaxation oscillator or generator, such as a blocking oscillator, for the production of the pulses supplied to the counter circuit, which blocking oscillator pulse generator is influenced by a fluctuating supply voltage varying according to a chance function. This blocking pulse generator causes a short pulse to arise, immediately after which the generator is temporarily blocked because the condenser, included in the grid circuit and charged with negative voltage via an inductive feedback, is slowly discharged so that another pulse cannot be produced until this condenser has been discharged. Thus, a definite division between the passive and active states of the pulse generator is obtained, and once a pulse has been started by such a generator a change in the negative bias supply to the grid cannot cause the generation of the pulse to stop, provided such change does not take place too abruptly. In order to prevent such an abrupt change the device for cutting off the supply of pulses when a digit is to be selected, includes a smoothing device such as a time constant circuit so that the pulse generator will be stopped only during its passive state regardless of when the interruption for digit selection occurs. Furthermore, the fluctuating voltage source may be modulated to control its repetition frequency so that no pulses can be produced by the fluctuating device which cannot be separately detected by the counter circuit; and the pulses produced by the blocking oscillator pulse generator may be gated to insure the passage of only those pulses of a sufficient magnitude to operate the counter.

The above mentioned and other features and objects of this invention and the manner of attaining them are given more specific disclosure in the following description of an embodiment of this invention taken in conjunction with the accompanying drawings, wherein:

Fig. I is a schematic wiring diagram of the first five parts (I–V) of a random digit generator circuit according to this invention based on the binary number system;

Fig. II is a continuation of the wiring diagram shown in Fig. I of the last three parts (VI–VIII) of the random digit generator circuit.

These eight parts (I–VIII) of the circuit disclosed may be divided into three groups and identified as follows:

A. The fluctuating pulse generator circuit (Fig. I)

I. Fluctuating device
II. Amplifier

B. The astable oscillator pulse generator circuit (Fig. I)

III. Cathode follower I
IV. Blocking oscillator
V. Cathode follower II

C. The counter circuit (Fig. II)

VI. Counting trigger circuit
VII. Gate circuit
VIII. Level trigger circuit

A. The fluctuating pulse generator

Referring to Fig. I, there is shown at the left a device in part I for producing fluctuating pulses according to a chance function, herein shown to be a gas filled triode tube V1 which is placed in a magnetic field such as by a permanent magnet M. From this tube V1 a varying noise voltage is passed through a three stage amplifier in part II comprising tubes V2, V3 and V4 to their output at point A. Connected to the anodes across the outputs of the first two amplifying stages represented by tubes V2 and V3 are condensers C5 and C9, respectively, which are chosen to modulate the frequency spectrum from the fluctuating device of part I in order to limit the repetition rate of the pulses produced by the device to within a frequency range definitely capable of separate pulse detection by the following counter circuit, so that all the pulses counted will each produce the same degree of change in the counting circuit.

B. The astable oscillator pulse generator circuit

The fluctuating voltage pulses appearing at the output A of the amplifier part II are applied to the grid of a first cathode follower tube V5I in part III, which tube is normally conductive when the circuit is in operation. The cathode of this tube V5I at the point or terminal E is connected through a condenser C15, by-passed by a leaking resistance R21, through one coil L2 of a transformer, to the grid of an astable relaxation type generator, or herein a blocking oscillator, tube V6 in part IV of the circuit, similar to that described in Terman's "Radio Engineering" 3d edition, 4th impression, pp. 590–591. According to this connection, the cathode voltage of the cathode follower tube V5I is influenced by the voltage occurring at the condenser C15, which latter voltage is determined by inductive feed back between the plate and grid of tube V6 through coils L1 and L2 of the transformer of the blocking oscillator circuit. This blocking oscillator circuit of part IV can be considered as a normal generator circuit with a tuned grid circuit in which the tuned grid circuit has an exceedingly large inductance-capacitance ratio, the capacitance of which is produced by the winding capacity of the coil of the transformer, the tube capacities, and the wiring capacity. The coupling between the plate coil L1 of the transformer of this circuit, and the grid coil L2 is very large and the winding ratio is such that the grid control is exceedingly large.

During the generation of a pulse by the blocking oscillator pulse generator, the condenser C15 is charged so that its right side connected to the cathode of tube V6 becomes negative, shortly after the pulse is produced in the output of the circuit, thus cutting off the tube V6 until the condenser C15 can be discharged by the leaking off of its charge through the resistance R21. As soon as sufficient charge has leaked from the condenser C15 so that the negative voltage on the right side of this condenser is equal to the cut-off voltage of the tube V6, the tube V6 becomes conductive again and the process is repeated.

Accordingly, the pulses produced by this circuit in part IV are separated by passive intervals during which the condenser C15 is discharging. The charge on the condenser C15, however, may be varied by varying the voltage at the point E, which varies corresponding to the amplified and filtered fluctuating voltages at the point A produced by the fluctuating device, so that the repetition frequency of the blocking pulse generator is varied according to the chance function of the pulses supplied from parts I and II.

The generation of the pulses by the blocking oscillator pulse generator can be entirely stopped or interrupted by biasing the cathode follower V5I with a negative voltage from the terminal S, which voltage may be applied to the terminal S which is operated when a random digit is to be selected. By thus applying a negative voltage from the terminal S through resistances R56 and R19 to the grid of the cathode follower tube V5I, this tube may be cut off and become non-conductive, so that the high voltage applied to its cathode, herein shown to be −150 volts (Fig. II), through resistance R20 is then applied to the grid of the blocking oscillator tube V6, so that it cuts-off and becomes non-conductive also.

In order to prevent the voltage supply switched in at terminal S from affecting or mutilating a pulse which may that same time be in the process of production in the blocking oscillator pulse generator circuit, a smoothing circuit is provided connected to the terminal S, comprising a time constant circuit of resistance R56 and condenser C31 connected between the terminal S and resistance R19. This smoothing circuit delays the build up of the negative voltage applied to the grid of the tube V5I, so that it is gradual and not abrupt and thus will not materially influence any pulse which may then be in the process of being formed in the blocking oscillator pulse generator circuit. Thus, the supply of pulses from the blocking oscillator pulse generator is only cut off between successive pulses, or during the passive state of operation of tube V6, so that no pulse mutilation can possibly occur.

As a safety measure, the output of the blocking oscillator pulse generator circuit may include a second cathode follower tube V5II, the grid of which tube V5II may be connected to the output coil L3 of the blocking oscillator circuit transformer. This grid is also connected to a potentiometer of resistances R52 and R53, so as to provide a threshold for the tube V5II to preclude the passage of impulses which may be too small, that possibly may be caused when an interruption of the circuit takes place by the application of digit selecting voltage to the terminal S. This potentiometer of R52 and R53 together with the smoothing circuit of resistance R56 and condenser C31 above mentioned, eliminate the danger of mutilated pulses being transmitted or supplied to the counting circuit of Fig. II and eliminate the possibility that one of the two states of the trigger circuit of part VI (which follows) is preferred to that of the other state.

If the negative potential is not applied to the terminal S, the various voltages received at the point A are immediately transmitted through the first cathode follower tube V5I of part III to the point E, and these pulses are in turn transformed into short independent pulses of substantially the same magnitude by the blocking oscillator circuit of part IV, which pulses are transmitted through the second cathode follower V5II. Since the voltages from the blocking oscillator supplied to the grid of the second cathode follower tube V5II influence the plate current of this tube, these voltages are changed by the cathode resistance R26, and are thus passed to the point B (Fig. II).

C. The counter circuit

The voltage pulses from point B are passed through condenser C23 to the common cathode resistor R32 and to the cathodes of both the tubes V7 and V8 of the first or counting trigger or flip-flop circuit in part VI (Fig. II) of the circuit. This particular trigger circuit has two stable states, one in which the tube V7 is conductive and the tube V8 is non-conductive, and the other in which tube V8 is conductive and tube V7 is non-conductive. At every change in voltage or pulse occurring in the condenser C23, the trigger arrangement of part VI will correspondingly change its state.

It must now be possible to read the final result of the counting trigger circuit at the time a digit is to be selected and a negative voltage is applied to the terminal S (Fig. I), that is, to determine which of the two tubes V7 and V8 is conductive. For this purpose the anode of the trigger tube V8 is connected via condenser C26 to a point C and then to the grid of a gate tube V9 in part VII of the circuit. Connected to another grid of the same gate tube V9 is another terminal SCH to which there is normally applied a large negative voltage, so that the tube V9 is normally non-conductive. Thus, shortly after the high negative voltage (—150 v.) is applied to the point terminal S in Fig. I, a positive impulse is applied to the terminal SCH so that the gate tube V9 becomes conductive. This occurs sufficiently quickly after the moment that the supply of pulses to the counter circuit of part VI has been discontinued, that the charge on the condenser C26 has not had time to leak off or change to a considerable extent, and accordingly the point C will have a positive or negative potential depending upon whether tube V7 or V8, respectively, is conductive at that moment. In the former case the tube V9 will be conductive and carry an anode current when the positive impulse appears at the terminal SCH, since tube V7 through the condenser C26 also provides a positive pulse to the grid of the tube V9; while in the latter case the positive pulse applied to terminal SCH will not cause the tube V9 to become conductive, because a negative pulse is applied to the control grid of the tube V9 when the tube V8 is conductive.

Connected to the output of the gate tube V9 through a condenser C27, is a level trigger circuit shown in part VIII, comprising a pair of trigger tubes V10 and V11 which, respectively, take the same conductivity as tube V7 and V8. This is effected by connecting the grid of the trigger tube V10 to the output of the gate tube V9 through a condenser C27, which grid of tube V10 is biased by a potentiometer of resistance R54 and R55 which supplies a potential to said grid of half way between the two conditions of conductivity and non-conductivity of the gate tube V9. Thus, if the voltage from the tube V9 exceeds the voltage already applied to grid of the tube V10 from the potentiometer R54 and R55, the trigger tube V10 is made conductive and it changes over so that the tube V10 becomes conductive and tube V11 does not. This corresponds, respectively, to the conductivity of tube V7 and non-conductivity of tube V8 in the part VI of the circuit. However, when the tube V9 is not conductive, then no additional positive potential is applied to the grid of the tube V10 to that ordinarily applied by the potentiometer of resistances R54 and R55, so that tube V10 remains non-conductive, or is changed into non-conductive state.

The amount of current applied by the pulse from the gate tube V9, when tube V9 starts to draw anode current, is chosen by the value of the resistance R41 to be approximately twice as large as the current in the pulse which is applied to the same condenser C27 through resistance R42 from the terminal SCH, so that the pulses applied to the grid of the tube V10, when a pulse is applied to terminal SCH, are either positive or negative. Thus, the current pulses passed through the condenser C27 are sufficiently large so that they change the voltage at the right side or output of the condenser C27 to values either over or under the above mentioned critical value supplied by the voltage divider or potentiometer of resistances R54 and R55.

The output of the level trigger circuit of part VIII may be connected to the anode of the trigger tube V11 and terminal D, through which terminal D the actual state of the counting trigger circuit of part VI can be detected or observed, such as by the aid of a voltage meter or the like. If required, however, further devices can be connected to the terminal D to pass on this information to other circuits. After this indication of the selection of a random digit has occurred the random digit generator can be operated for the selection of another random digit. Since this selection switching of potentials applied to terminals S and SCH can all be done electronically, the selection of random digits can be done rapidly.

This invention also may be considered as an electronic lot drawing device and may be applied to other than a binary numerical system by replacing the flip-flop binary trigger circuit shown in Fig. II by a ring trigger circuit, without departing from the scope of this invention.

While there is described above the principles of this invention in connection with specific apparatus, it is to be clearly understood that this description is made only by way of example and not as a limitation to the scope of this invention.

What is claimed is:

1. A random digit generator comprising: a fluctuating noise generator, a normally astable oscillator for generating pulses, means affecting the pulse repetition rate of said oscillator by the noise from said noise generator, counter means responsive to the pulses of said oscillator, means to start and stop said oscillator, and stabilizing means to insure said starts and stops only between full pulses generated by said oscillator.

2. A random digit generator according to claim 1 wherein said stabilizing means comprises a time constant smoothing circuit.

3. A random digit generator comprising: a noise generator, an amplifier for said noise generator, means for limiting the frequency amplified by said amplifier, a normally astable oscillator for generating substantially equally time spaced pulses, means affecting the pulse repetition rate of said oscillator by the noise from said noise generator, counter means responsive to the pulses from said oscillator, means for stopping and starting said oscillator during predetermined intervals, and means for insuring full pulses from said oscillator regardless of the time of operation of said means for stopping and starting.

4. A random digit generator according to claim 3 wherein said means for insuring full pulses comprises a time constant circuit.

5. A random digit generator according to claim 3 wherein said means for affecting the pulse repetition rate of said oscillator includes a cathode follower.

6. A random digit generator according to claim 3 wherein said astable oscillator comprises a relaxation type generator.

7. A random digit generator according to claim 3 wherein said astable oscillator comprises a blocking oscillator.

8. A random digit generator according to claim 3 wherein said noise generator comprises a gas filled tube surrounded by a permanent magnet.

9. A random digit generator according to claim 3 wherein said counter means comprises a trigger circuit.

10. A random digit generator according to claim 3 wherein said means responsive to the pulses from said oscillator includes means for detecting the condition of said counter means.

11. A random digit generator according to claim 3 wherein said means for limiting the frequency amplified by said amplifier includes a pair of condensers.

12. A random digit generator according to claim 3 wherein said means for starting and stopping said oscillator comprises applying and removing a given potential to and from said oscillator.

13. A random digit generator according to claim 3 including a cathode follower connected between said output of said oscillator and the input of said counter means.

14. A random digit generator, comprising in combination: a blocking oscillator for generating triggering pulses, a voltage fluctuation source for generating voltage fluctuations according to a chance function, an amplifying and filtering circuit for amplifying and filtering said voltage fluctuations, a first biasing means under control of said fluctuation source for modulating the frequency of the pulses generated by said blocking oscillator in accordance with said fluctuations, a second biasing means including a time constant circuit for disabling said blocking oscillator after the same has been enabled to generate a whole number of triggering pulses during a predetermined time interval, a multi-stable counter circuit for dividing the number of pulses generated by said blocking oscillator during said interval, indicating means for indicating the condition of said counter circuit, and a gating circuit for connecting said indicating means to said counter circuit after the lapse of said time interval.

15. A generator according to claim 14 wherein said multi-stable counter circuit comprises a bi-stable counter circuit.

16. A generator according to claim 14 wherein said multi-stable counter circuit comprises a bi-stable multivibrator.

17. A generator according to claim 14 including a coupling means between said blocking oscillator and said counter circuit comprises a cathode follower and a transformer.

18. A generator according to claim 14 wherein said first biasing means includes a cathode follower.

19. A generator according to claim 14 wherein said amplifying and filtering circuits comprise at least two amplifier tubes and two condensers connected to the outputs of said two tubes.

References Cited in the file of this patent

UNITED STATES PATENTS

| | | |
|---|---|---|
| 2,373,145 | Sensiper et al. | Apr. 10, 1945 |
| 2,403,984 | Koenig, Jr. et al. | July 16, 1946 |
| 2,404,047 | Flory et al. | July 16, 1946 |
| 2,408,078 | Labin et al. | Sept. 24, 1946 |
| 2,416,307 | Grieg | Feb. 25, 1947 |
| 2,440,261 | Ginzton | Apr. 27, 1948 |
| 2,448,814 | Mann et al. | Sept. 7, 1948 |
| 2,486,106 | Brown | Oct. 25, 1949 |
| 2,539,014 | Frantz | Jan. 23, 1951 |
| 2,607,896 | Chambers | Aug. 19, 1952 |